United States Patent [19]
Parker

[11] Patent Number: 5,260,685
[45] Date of Patent: Nov. 9, 1993

[54] TIME-DELAYED SELF-CANCELLING TURN SIGNAL

[75] Inventor: David G. Parker, Kokomo, Ind.

[73] Assignee: Federal-Mogul Corporation, Southfield, Mich.

[21] Appl. No.: 854,259

[22] Filed: Mar. 20, 1992

[51] Int. Cl.$^5$ ............................................. B60Q 1/40
[52] U.S. Cl. ................................... 340/477; 340/476
[58] Field of Search ...................... 340/475, 476, 477

[56] References Cited
U.S. PATENT DOCUMENTS 3,924,163 12/1975 Holt ................................. 340/476 X
4,275,379 6/1981 Nakamo ......................... 340/476 X
4,333,071 6/1982 Kira ..................................... 340/477
4,638,290 1/1987 Wagner ............................. 340/476

Primary Examiner—John K. Peng
Assistant Examiner—Christine K. Oda
Attorney, Agent, or Firm—Lawrence J. Shurupoff

[57] ABSTRACT

A vehicle turn signal mechanism includes a lockout device in the form of an electric timer. The flashing signal is normally cancelled by a steering wheel sensor that is arranged to generate a triggering signal for an electromagnetic detent associated with a signal selector lever. The lockout device prevents the triggering signal from being generated except after the steering wheel has been retained in its straight-ahead position for a predetermined time period.

5 Claims, 4 Drawing Sheets

FIG 1
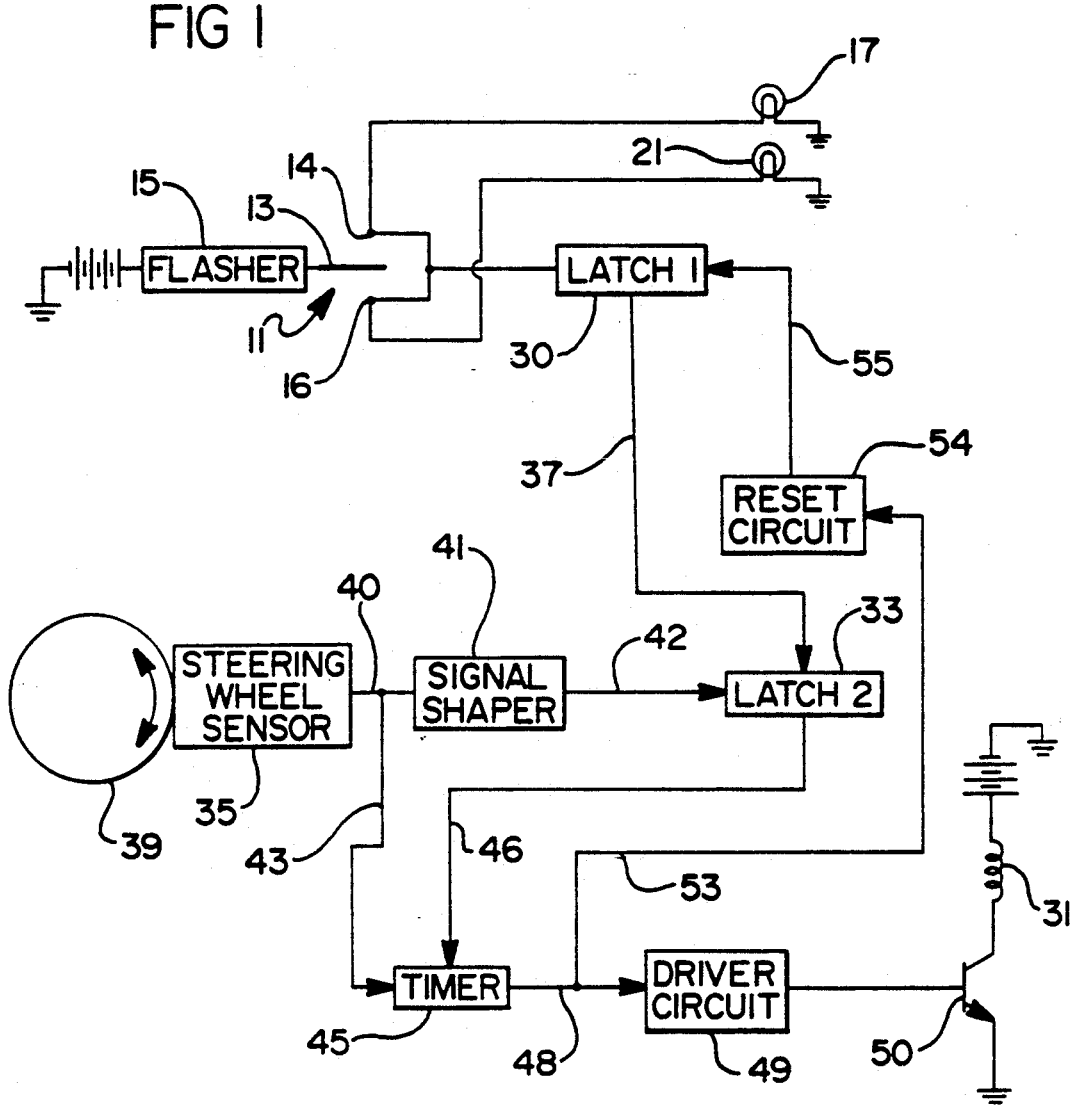
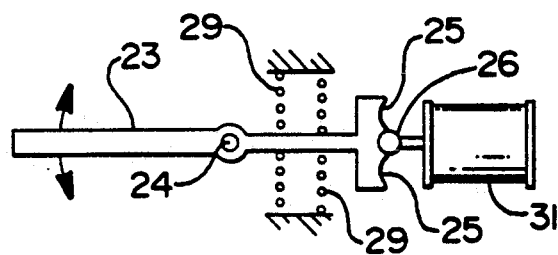
FIG 2
PRIOR ART

TIME-DELAYED SELF-CANCELLING TURN SIGNAL

BACKGROUND OF THE INVENTION

1. Field of the Invention

This invention relates to automotive turn signals, particularly turn signals used on trucks of the tractor-trailer type. The invention is especially concerned with a control system for returning a manually operated signal selector to a neutral position following a turning maneuver. The process is sometimes referred to as self-cancellation of the turn signal.

2. Description of Prior Developments

Automotive vehicles are commonly equipped with turn signals, i.e. flashing lights on the front and rear ends of a vehicle that warn other motorists that the driver of the vehicle intends to make either a right turn or a left turn. To actuate the turn signal lights, the driver operates a manual lever located on the steering wheel. As the lever is moved from a neutral position to a selected operating position, the associated switches are opened and closed thereby supplying current to flasher devices and the associated turn signal lights.

In many cases, the turn signal system is equipped with a self-cancelling feature which includes a mechanism for automatically returning the manual lever to its neutral position following a turning maneuver By thus returning the lever to its neutral position, the turn signal is cancelled so that the signal lights cease flashing thereby avoiding a false warning to other motorists that the driver might be contemplating another turning maneuver.

The self-cancelling mechanism can include an electrical sensor associated with the vehicle steering wheel to detect whether the steering wheel is in a straight-ahead position or in a turning position. Also, an electrically-operated detent is provided for retaining the lever in its various positions. Springs may be used to bias the lever toward its neutral position.

In operation of the system, when the driver returns the steering wheel to its straight-ahead position following a turning maneuver, the electrical sensor detects the change in steering wheel condition by sending a signal to the electrically-operated detent. The detent releases the lever which allows the associated springs to automatically return the lever to its neutral position. The detent can include an electromagnet coil and a detent structure operated by the coil.

As used in automobiles, the self-cancelling feature is generally effective for its intended purpose. However, when the system is used on trucks of the tractor-trailer type, it may not be satisfactory under all circumstances. For example, while the driver of a tractor-trailer is in the process of making a left turn, he will sometimes swing the truck first to the right and then to the left. The initial right turn provides clearance for the intermediate wheels during the actual left turn. In a similar manner, when making a right turn, the driver will sometimes initially turn the vehicle to the left before making the right turn. Again, this is for the purpose of obtaining sufficient curbside wheel clearance.

When the driver of a tractor-trailer makes two successive turns in opposite directions, as described above, there is a danger that the turn signal system will prematurely self-cancel during the turning process, i.e. before the turn is completed. When this occurs, the following motorist can misinterpret the inadvertent cancellation of the signal as an indication that the driver had decided not to make the turn. Confusion on the part of the following motorist could lead to an accident.

The above-described premature signal cancellation action occurs because the driver moves the steering wheel through the straight-ahead condition during the process of going from one turn direction to the other turn direction. As the steering wheel reaches the straight-ahead condition, the wheel sensor sends a signal to the electromagnetic detent which prematurely returns the signal select lever and associated switches to the neutral, no-turn position.

The present invention is directed to a control system including electrical circuitry for preventing premature cancellation of a turning signal, particularly under the above-described condition wherein the driver sets the signal selector lever in an operating position for a signal and then turns the steering wheel in two different directions during the course of a turning maneuver. In one form of the invention, an electrical timer is interposed between the steering wheel sensor and the electromagnetic detent. When the steering wheel is moved from one turn direction through the straight-ahead position to the other turn direction, the time delay generated by the timer prevents the cancellation signal from reaching the electro-magnetic detent. The timer is designed to terminate or disable the premature cancellation signal.

Electrical timers have previously been employed in turn signal systems. However, such timers have been used primarily for cancelling the turning signal only when the steering wheel is moved an insufficient amount to effect signal cancellation, e.g., when the signal is used to change traffic lanes or when the wheel sensor is ineffective to produce the signal cancellation action.

U.S. Pat. No. 3,308,428 to Grontkowski shows a turn signal system having a timer for cancelling the turn signal at a predetermined time after initial turn-on of the signal lights or after application of foot pressure to the vehicle brake, e.g., when the vehicle is brought to a stop at a traffic light. The timer is apparently used as an override device to effect a signal cancellation action in the event the wheel sensor is ineffective for that purpose.

U.S. Pat. No. 4,792,785 to Yukio, et al. shows a turn signal system having a timer for cancelling a turn signal only when the vehicle is travelling at a high rate of speed. The turn signal is turned off at a predetermined time following initial turnon of the signal lights. The timer is only operative under high speed conditions. Under normal conditions, the steering wheel sensor controls the signal cancellation process.

In both the Grontkowski and Yukio systems, the timer is used as an auxiliary device for turning off the signal, i.e. for signal cancellation. In the present invention, the timer is used as a device for preventing premature cancellation of the signal especially while the steering wheel is passing through a straight-ahead condition from one turn direction to another turn direction.

SUMMARY OF THE INVENTION

The invention is directed to a turn signal system that includes a first electrical latch set in the latched position by manual movement of the signal selector level to the signalling position. The system further includes a steering wheel position sensor that controls a second electrical latch. The second latch is connected to the first latch and to a timer so that the timer can remain in the timing mode only when the steering wheel is in its straight-ahead position.

While the steering wheel is turned away from its straight-ahead position in either direction, the timer is inoperative or inactive. Should the steering wheel remain in its straight-ahead position for a predetermined time period, e.g., two, three or four seconds, the timer will run through its cycle to apply an output signal to a driver circuit for an electromagnet detent associated with the signal selector lever. When the detent is de-energized by the driver circuit, the lever is immediately returned to the neutral, no-turn position so that the turning signal is cancelled.

The system allows the driver to move the steering wheel in two directions while making a turning maneuver without prematurely cancelling the turn signal. For example, when making a right turn, the driver can initially turn the steering wheel to the left to provide a wide turning arc and then to the right. During the course of such a turning maneuver, the steering wheel will move through the straight-ahead position without actuating the electromagnetic detent for the signal selector lever. The timer will go inactive since the wheel will not remain in the straight-ahead position for a sufficient length of time to let the timer run through its cycle. When the turn has been completed and the steering wheel returned to its straight-ahead position for a sufficient time, e.g., four seconds, the timer will generate an output signal to the driver circuit to disable the electromagnetic detent to effect a signal cancelling operation.

In the described system, the function of the timer is to prevent short-duration positioning of the steering wheel in the straight-ahead position from producing a cancellation of the turning signal. The timer ensures that the turning signal will be cancelled only after the steering wheel has been returned to its straight-ahead position and has remained in such a position for a predetermined time, e.g., several seconds.

THE DRAWINGS

FIG. 1 is a schematic view of an electric circuit embodying the invention.

FIG. 2 is a view of a signal selector lever and detent mechanism useful in practice of the invention.

DETAILED DESCRIPTION OF THE PREFERRED EMBODIMENTS

Figure 3:
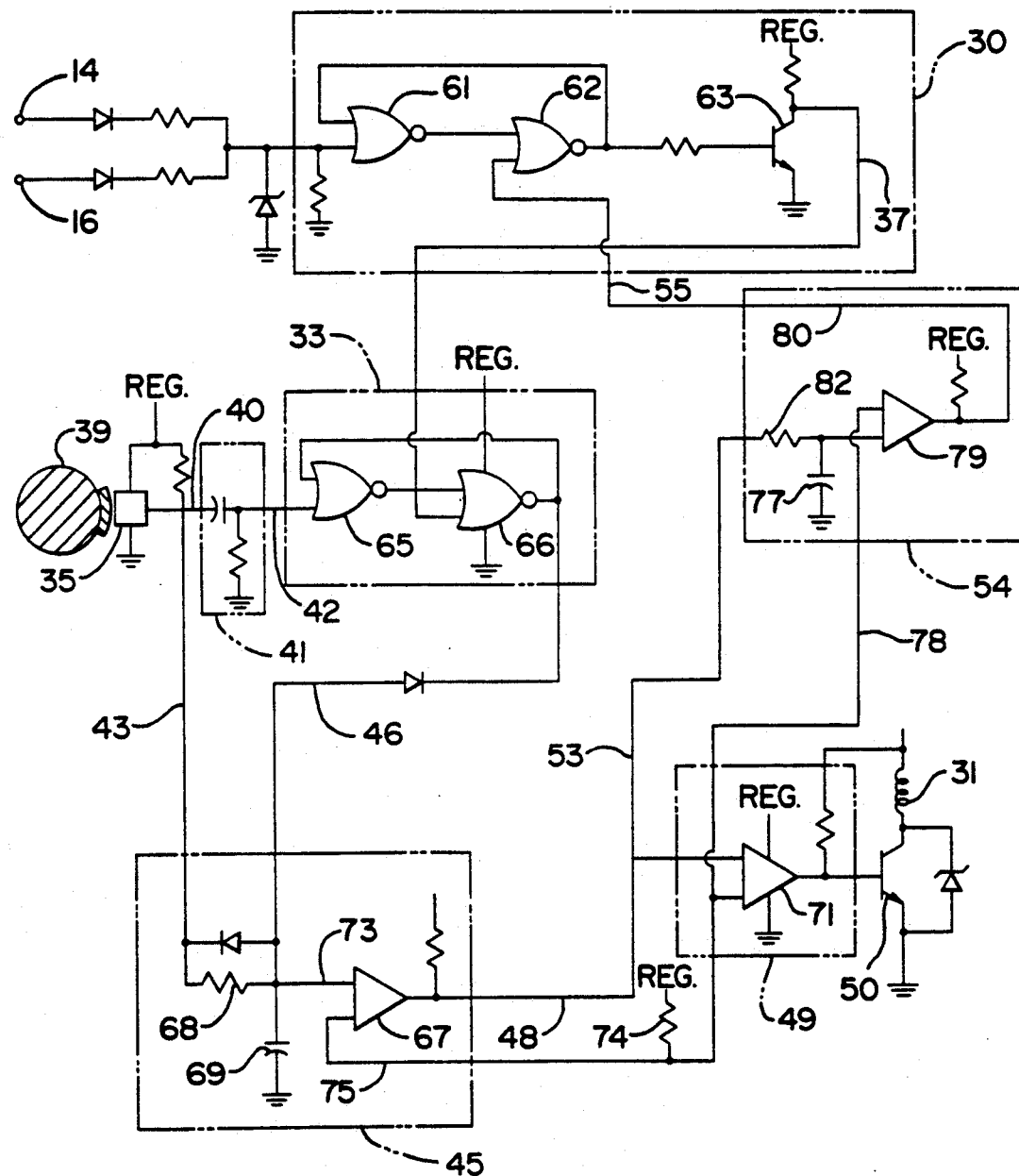
FIG. 3 is a view of the FIG. 1 circuit but with certain components shown in greater detail.

FIG. 1 shows a control circuit that includes a turn signal switch 11 having a switch arm 13 movable between a neutral position and two different operating positions. In one operating position, the switch arm delivers battery current to flasher 15 through contact 14 to a signal lamp 17. In the other operating position, the switch arm delivers battery current to flasher 15 through contact 16 to signal lamp 21. One signal lamp will typically be located on the right side of the vehicle to signal a right turn and the other signal lamp will be located on the left side of the vehicle to signal a left turn.

FIG. 2 shows some features of a manually operable selector lever 23 for moving switch arm 13 between a standby, neutral position and two operating positions. The selector lever is pivotally mounted on a pivot 24 so that it can move in either direction to generate a right turning signal or a left turning signal. Detents 25 are associated with an electromagnet 31 for holding lever 23 in any of its three positions.

Coil springs 29 normally bias the lever to the neutral, standby position as shown in FIG. 2. When the lever is manually moved to operate switch arm 13 to a signalling position (up or down in FIG. 2), the lever rides over one of the detents 25 after which the detent engages the lever to hold it in the signal position against the bias of springs 29.

An electromagnetic coil 31 is de-energized to retract detent pin 26, thereby enabling springs 29 to return the lever to its neutral, no-signal position. The process is sometimes referred to as signal cancellation in that, when the selector lever is returned to the neutral position, the turn signal lamps 17 or 21 are automatically extinguished. The electromagnetic detent structure shown in FIG. 2 is generally old in the art.

Referring again to FIG. 1, a turn signal control circuit is shown to include a first electric latch 30 that is triggered to a latched condition by movement of switch arm 13 to either of its closed positions for respectively generating either a right turn signal or a left turn signal. A second latch 33 is triggered to a latched condition by a signal sent from steering wheel sensor 35 through line 42, when the steering wheel is moved from a straight-ahead position to a turning mode and back to the straight-ahead position.

Steering wheel sensor 35 detects the rotated position of steering wheel 39 so that when the steering wheel is in a straight-ahead condition the sensor has one type of output, and when the steering wheel is in a vehicle turning condition the sensor has a different type of output. The sensor output is directed through line 40 to a signal shaper 41 that produces a pulse when the signal goes from low to high. The pulse is applied through line 42 to latch 33. The sensor output is also directed through line 43 to an electric timer 45.

Sensor 35 provides one type of output when the steering wheel is in the straight-ahead, no-turn condition and a different output when the steering wheel is turning left or right. Sensor 35 can take various forms, e.g., a Hall-effect switch responsive to a permanent magnet carried by the steering wheel, a reed switch responsive to a magnet on the steering wheel, or a light-emitting diode and photo transistor located on opposite sides of a light control shutter carried by the steering wheel or other structure driven by the steering wheel. U.S. Pat. No 4,275,379 to Nakano shows some steering wheel sensor constructions that can be used.

Latch 33 has a control line 46 connected to timer 45 for triggering the timer into or out of its timing mode. When latch 33 is set in a latched condition by suitable input signals in lines 37 and 42, line 46 will enable timer 45 to time out, i.e. provide a delayed output signal in timer output line 48. The timer is charged through line 43. The delayed timer signal is applied to a driver circuit 49 that disables transistor 50 in circuit with the coil (electromagnet) 31 described previously in connection with FIG. 2.

When transistor 50 is disabled, coil 31 is de-energized to return signal selector lever 23 to its neutral position as shown in FIG. 2. Simultaneously, switch 13 is returned to the open circuit position for extinguishment of the signal lamps 17 or 21. Such lamp extinguishment constitutes the signal cancellation event previously mentioned.

If the driver of a tractor-trailer vehicle desires to make a right turn, the driver may initially turn steering wheel 39 (FIG. 1) to the left to achieve wheel clearance and then to the right to negotiate the turn. During this process, steering wheel sensor 35 generates two different types of signals in line 40, i.e. one signal while the wheel is in the left turn mode or right turn mode, and a different signal while the wheel is on center as it moving from the left turn mode through the straight-ahead condition in order to reach the right turn mode.

With conventional turn signal systems, there is a possibility that the wheel sensor signal generated during this transitional motion of the steering wheel through its straight-ahead position will produce a premature cancellation of the turn signal, e.g., a cancellation of the signal just as the vehicle is beginning to make the right turn. The circuit of FIG. 1 is designed to prevent premature signal cancellation.

Timer 45 is designed to achieve a short time delay before generating a triggering signal in line 48. Typically, the delay is about four seconds but any predetermined delay period may be used. The purpose of this delay is to enable the steering wheel to pass through its straight-ahead position without de-energizing the electromagnet detent coil 31. Thus, short duration alignments or positioning of the steering wheel 39 in its straight-ahead position are prevented from altering the condition of coil 31.

Coil 31 can only be de-energized when the steering wheel remains in its straight-ahead condition for a period longer than the time delay built into timer 45, e.g., four seconds in the illustrated embodiment. The system is designed so that coil 31 is de-energized only after the vehicle turn has been completed. Premature de-energization of coil 31 during the course of the turning maneuver is prevented by the time delay.

Latch 33 is connected to sensor 35 and timer 45 so that when steering wheel 39 is in its straight-ahead position, latch 33 sends an enabling signal to timer 45 through line 46. The timer goes into the timing mode for generating a signal in line 48 after the timer cycles out, e.g., after a four-second time delay period. If, during the time delay period, sensor 35 senses that the steering wheel is no longer in its straight-ahead position, the sensor will discharge the timer without producing a coil de-energization signal in line 48.

Line 48 is connected to a circuit line 53 that leads to a reset circuit 54. The purpose of reset circuit 54 is to reset latches 30 and 33 to their unlatched states at a predetermined time after de-energization of coil 31. Reset circuit 54 includes a time delay circuit for delaying the latch reset action until after de-energization of coil 31. The delay period may be about two seconds. The latch reset pulses are applied to the latches through reset line 55.

FIG. 3 is another depiction of the FIG. 1 circuit with certain components thereof shown in greater detail in order to facilitate a more complete understanding of the invention. Similar reference numerals are applied to corresponding components in the two views. In FIG. 3, dashed lines are used to outline certain components such as latch 30, latch 33, signal shaper 41, timer 45, driver circuit 49 and reset circuit 54.

As shown in FIG. 3, latch 30 includes two NOR gates 61 and 62, and a transistor 63. Latch 33 includes two NOR gates 65 and 66. Timer 45 includes a comparator 67, a resistance 68 and a capacitance 69. The resistance and capacitance form a charging device for accumulating a voltage at one input of the comparator. Driver circuit 49 includes a comparator 71.

In FIG. 3, the designation "REG" signifies a voltage source having a relatively stable nonvarying varying value, e.g., seven volts. The regulated voltage is applied to various circuit components as shown in FIG. 3.

Figure 4:
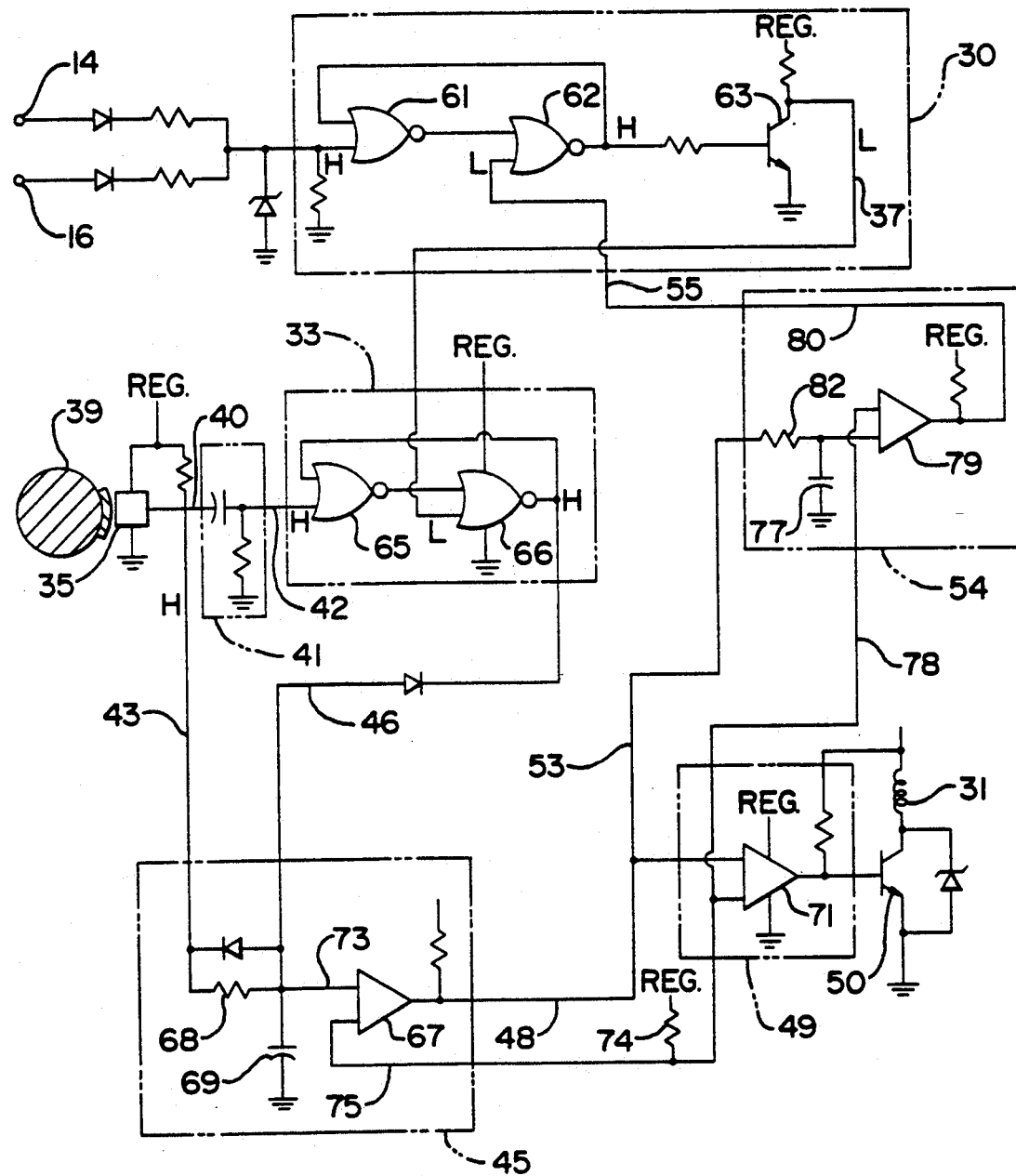
FIG. 4 is a view similar to FIG. 3 but with symbols added to designate high and low circuit values achieved when the steering wheel of the vehicle has been rotated off of the straight-ahead condition and brought back to a straight-ahead condition.
Figure 5:
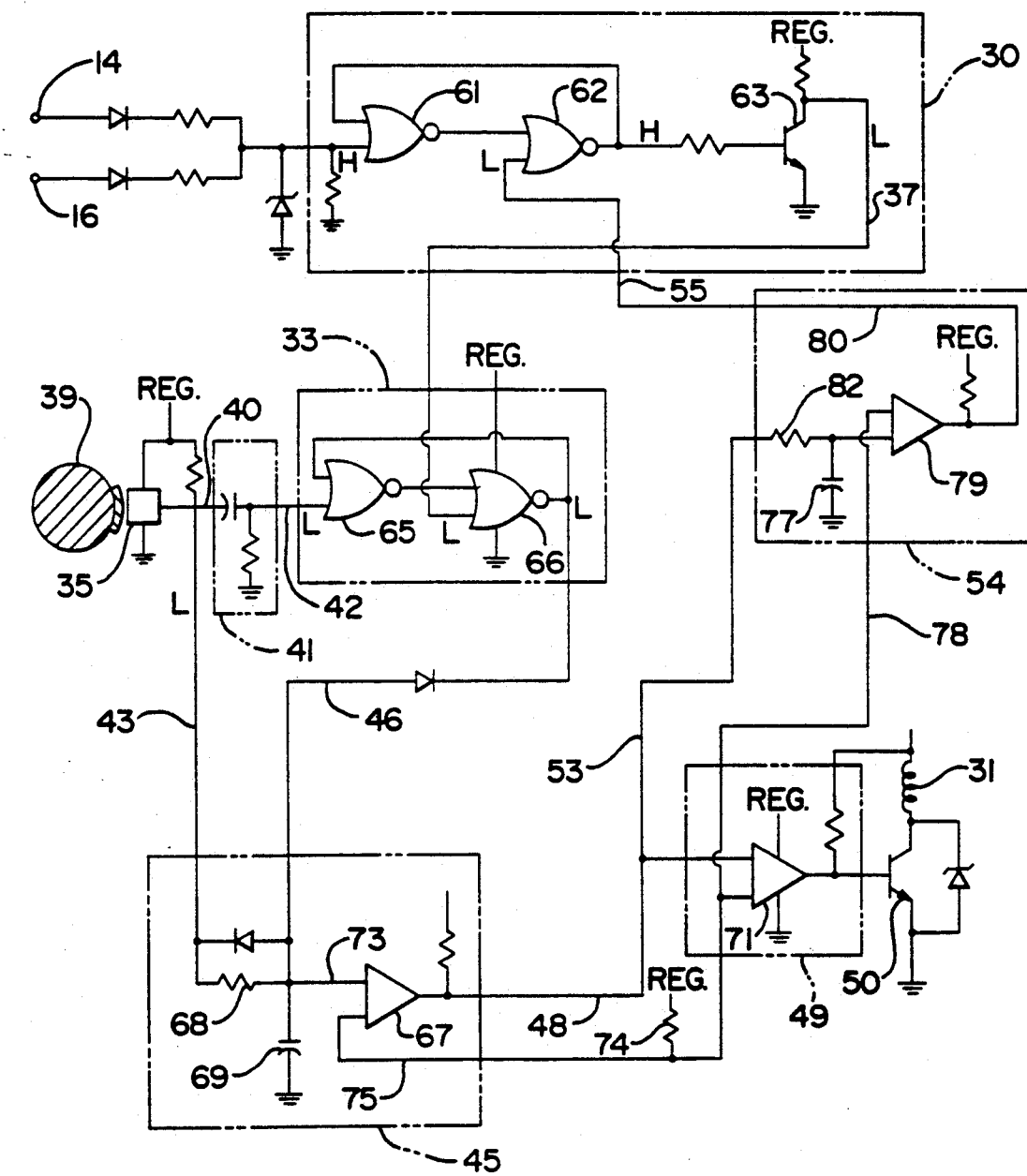
FIG. 5 is a view similar to FIG. 4 but showing high and low circuit values achieved when the vehicle steering wheel is in a vehicle turning mode.

In order to explain the operation of the FIG. 3 circuit, there are included two additional Figures showing, the FIG. 3 circuit in two different conditions. FIG. 4 shows the circuit when the flasher lamps are operating to signal a turn and the steering wheel 39 is in a straight-ahead condition. Such a condition can occur when signal selector 23 (FIG. 2) is initially moved to one of its operating positions to start the flasher lamps 17 or 21 flashing. FIG. 5 shows the circuit when the flasher lamps are operating and the steering wheel 39 is in the turning mode, to the left or to the right.

In the illustrated circuit, each of the NOR gates 61, 62, 65 and 66 has two inputs. A characteristic of the NOR gate is that when both inputs are low, the output is high. If either input is high, the output is low. In FIGS. 4 and 5, the symbol H is applied at various points in the circuit to designate a high signal. The symbol L designates a low signal or no signal.

In the circuit condition of FIG. 4, a voltage is applied through switch contact 14 or 16 to one input of NOR gate 61 so that the output of gate 62 is high, whereby the transistor 63 is conductive. Circuit line 37 thereby feeds a low signal to one input of NOR gate 66 to enable latch 33.

Wheel sensor 35 is a switch, whereby the signal in lines 40 and 43 is either high or low depending on the condition of steering wheel 39. In the present arrangement, when the steering wheel is in the straight-ahead condition, the signals in lines 40 and 43 are switched high. When the steering wheel is in the turning mode, the signals in lines 40 and 43 are switched low.

As further shown in FIG. 4, when line 40 is switched from low to high, the signal shaper 41 produces a high pulse on line 42 which causes the output of NOR gate 66 to go high.

The high signal in line 43 allows capacitor 69 to charge. After a delay period of about four seconds, depending on the selected values for capacitance 69 and resistance 68, a voltage is built up at input 73 of comparator 67 sufficient to produce a high signal in line 48, i.e. the voltage at input 73 is then higher than the voltage generated in line 75 by the regulated voltage source 74.

The high signal generated in line 48 is delivered to comparator 71 which disables transistor 50. The transistor is then turned off and coil 31 is de-energized to effect a cancellation of the turn signal by lamps 17 and 21 (FIG. 1). The signal cancellation action involves retractive movement of the detent pin 26 (FIG. 2) and return motion of the signal selector 23 to its neutral position.

However, if during the four-second delay period, the driver of the vehicle turns the steering wheel to initiate a turning maneuver, a low signal is produced from wheel sensor 35 and drains the voltage in capacitance 69 so that the line 48 will not turn on. FIG. 5 represents the condition of each latch in its latched state.

As previously noted, line 53 controls reset circuit 54. A high signal in line 53 for a predetermined period charges capacitance 77 to a value higher than the regulated voltage in line 78, thereby causing comparator 79 to deliver a high signal to reset line 80. The signal is delivered to latches 30 and 33 via line 55, whereby the associated NOR gate inputs are temporarily set high. When the reset signal is dissipated, the associated inputs to NOR gates 62 and 66 go low in preparation for another cycle of the turn signal mechanism. The values for capacitance 77 and the associated resistance 82 are selected so that the reset signal appears at line 55 approximately two seconds after de-actuation of coil 31.

A principal feature of the invention is the interaction of latches 30 and 33 with wheel sensor 35 and timer 45, whereby the timer remains in the timing mode only while the steering wheel remains in its straight-ahead position. This ensures that, while the steering wheel is being turned through its straight-ahead position between a right turn mode and a left turn mode, the flashing signal will not be prematurely cancelled.

Obviously, numerous modifications and variations of the present invention are possible in the light of the above teachings. It is therefore to be understood that within the scope of the appended claims, the invention may be practiced otherwise than as specifically described herein.

What is claimed is:

1. An automatic turn signal mechanism associated with a steering wheel movable from a straight ahead position to a left turning position and to a right turning position, said mechanism comprising:
   a manually operated signal selector comprising a neutral position, a first operating position displaced from said neutral position and a second operating position displaced from said neutral position;
   sensor means for detecting said straight ahead position and said left and right turning positions of said steering wheel, said sensor means comprising a first sensor output signal corresponding to said straight ahead position and a second sensor output signal corresponding to said left and right turning positions;
   a first electronic latch set in a first latched state by movement of said signal selector to either one of said first and second operating positions;
   a second electronic latch set in a second latched state in response to a combination of said first latched state of said first electronic latch and said second sensor output signal;
   a timer operatively associated with said sensor means and said second electronic latch, said timer activated to time out a predetermined time period in response to a combination of said second latched state of said second electronic latch and said second sensor output signal, said timer comprising a timer output signal produced after said predetermined time period; and
   electrically operated return means for returning said signal selector from one of said first and second positions to said neutral position in response to said timer output signal.

2. The mechanism of claim 1, further comprising a reset circuit connected to said timer and to said first latch for resetting said first and second electronic latches in response to said timer output signal.

3. The mechanism of claim 2, wherein said reset circuit comprises a time-delay means for delaying said resetting of said first and second electronic latches after said timer produces said timer output signal.

4. The mechanism of claim 1, wherein sad first and second electronic latches each comprises a NOR gate.

5. The mechanism of claim 1, wherein said sensor means comprises a magnetic switch.

* * * * *